No. 634,171. Patented Oct. 3, 1899.
T. HOLT.
APPARATUS FOR DECORATING TILES.
(Application filed Sept. 16, 1898.)
(No Model.) 4 Sheets—Sheet 1.
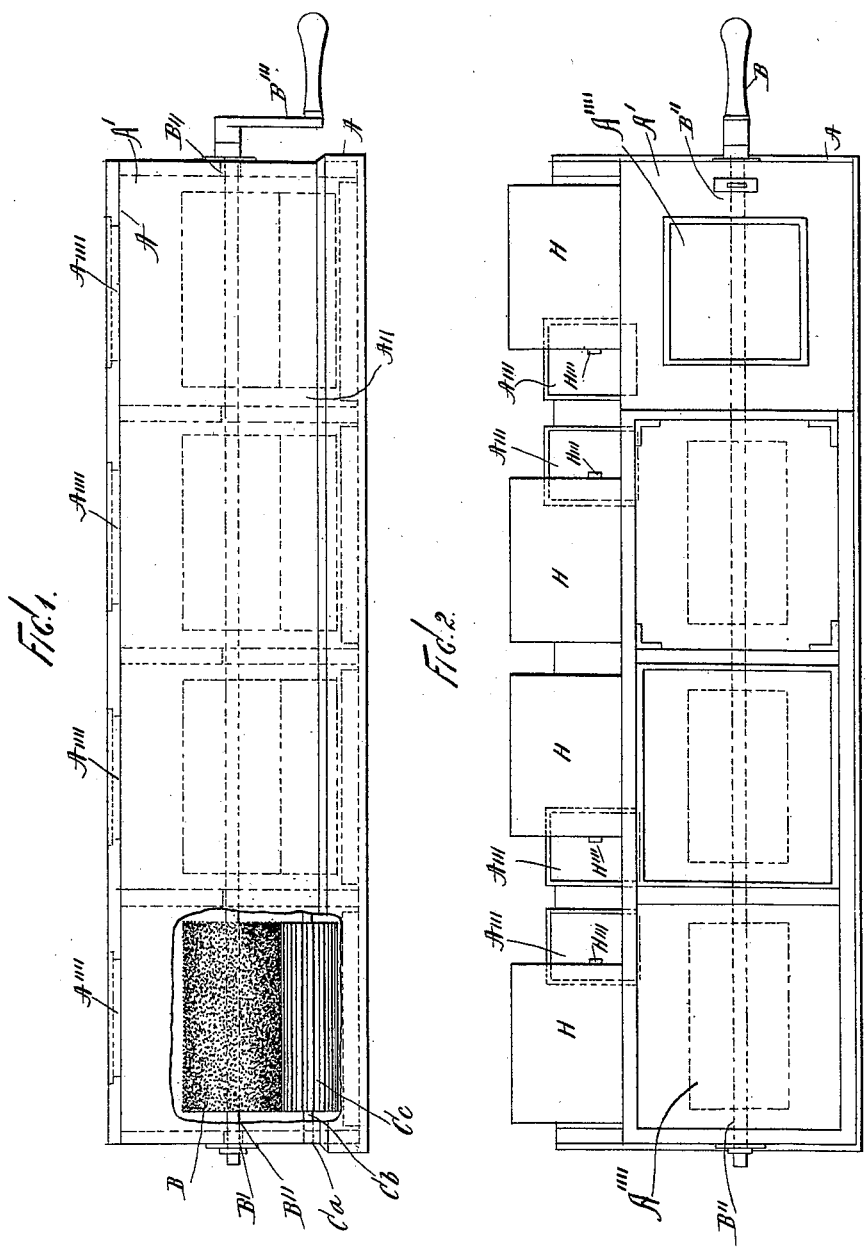
WITNESSES
INVENTOR
Thomas Holt,
BY
ATTORNEYS No. 634,171. Patented Oct. 3, 1899.
T. HOLT.
APPARATUS FOR DECORATING TILES.
(Application filed Sept. 16, 1898.)
(No Model.) 4 Sheets—Sheet 2.
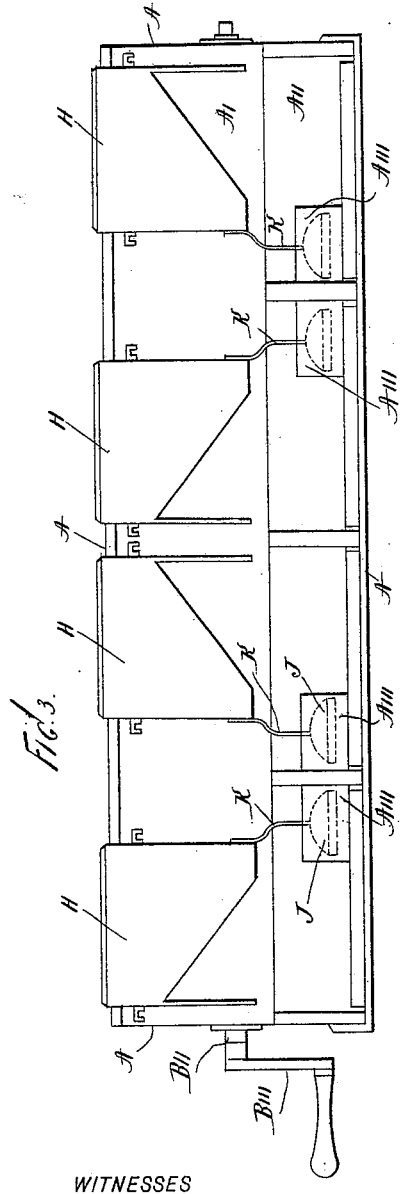
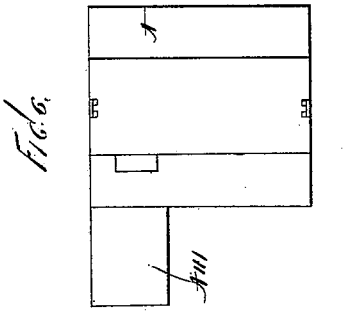
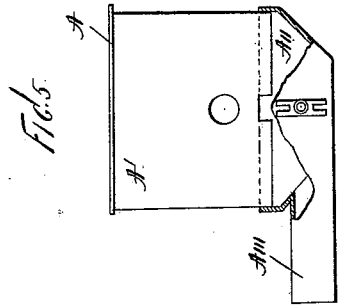
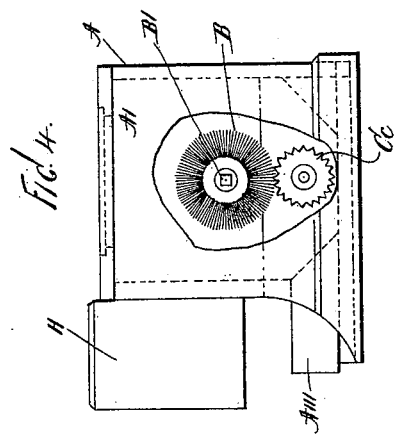
WITNESSES
John Buckler,
F. A. Stewart
INVENTOR
Thomas Holt,
ATTORNEYS No. 634,171. Patented Oct. 3, 1899.
T. HOLT.
APPARATUS FOR DECORATING TILES.
(Application filed Sept. 16, 1898.)
(No Model.) 4 Sheets—Sheet 3.
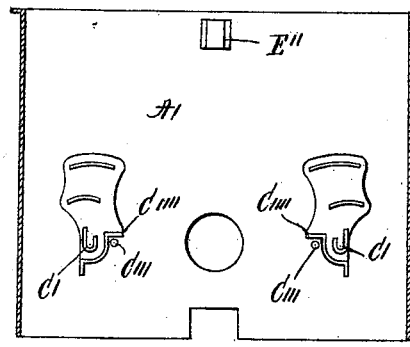
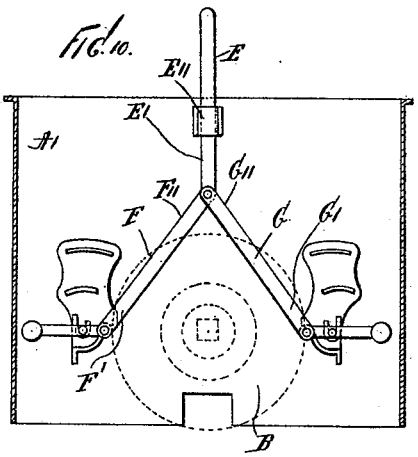
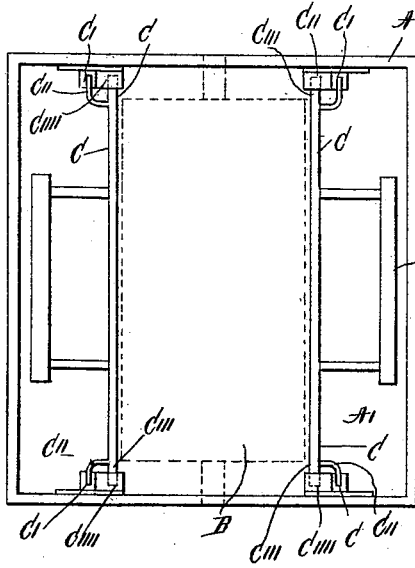
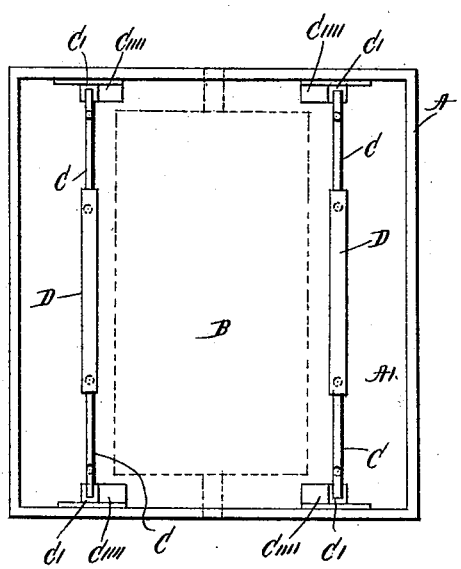
WITNESSES
John Buckler,
F. A. Stewart.
INVENTOR
Thomas Holt,
BY
Edgar Tate
ATTORNEYS
THE NORRIS PETERS CO., PHOTO-LITHO., WASHINGTON, D. C.

No. 634,171. Patented Oct. 3, 1899.
T. HOLT.
APPARATUS FOR DECORATING TILES.
(Application filed Sept. 16, 1898.)
(No Model.) 4 Sheets—Sheet 4.
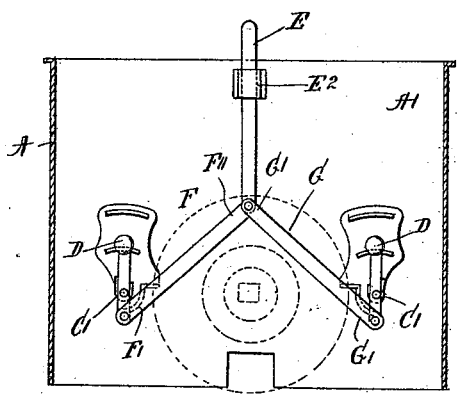
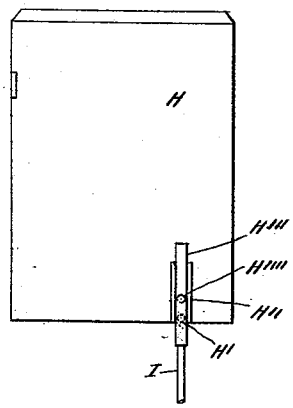
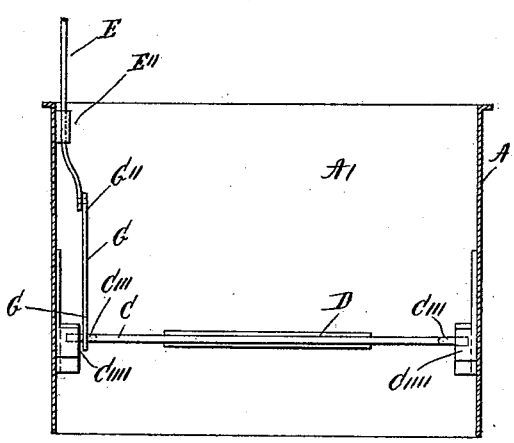
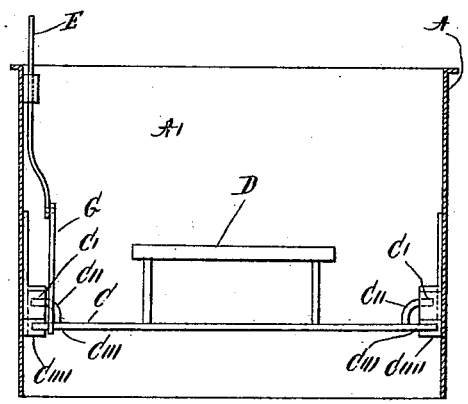
WITNESSES
John Buckler
F. A. Stewart
INVENTOR
Thomas Holt,
BY
Edgar Tate
ATTORNEYS

UNITED STATES PATENT OFFICE.

THOMAS HOLT, OF STOKE-UPON-TRENT, ENGLAND.

APPARATUS FOR DECORATING TILES.

SPECIFICATION forming part of Letters Patent No. 634,171, dated October 3, 1899.

Application filed September 16, 1898. Serial No. 691,112. (No model.)

*To all whom it may concern:*

Be it known that I, THOMAS HOLT, a subject of the Queen of Great Britain, residing at Stoke-upon-Trent, in the county of Stafford and Kingdom of England, have invented certain new and useful Improvements in Apparatus for Decorating Tiles, of which the following is a full and complete specification, such as will enable those skilled in the art to which it appertains to make and use the same.

This invention relates to decorating tiles and hollow ware, and has more special reference to apparatus and methods of decorating tiles and hollow ware made from clay, earthenware, dust, or the like material, which apparatus and method can also be applied to decorating the exterior surface or surfaces of hollow pottery-ware articles.

The object of my invention is to provide apparatus whereby coloring-matter may be applied to articles which it is desired to decorate quickly, cheaply, accurately, and cleanly. This I do by means of a tank or box which has a feed-tank adjacent in which is stored the coloring-matter and which feeds it into the main tank as desired. In the main tank is mounted a serrated roller adapted to pick up the coloring-matter from the bottom of the main tank and feed it to a revolving brush, above which and in turn strikes against adjustable splashers, which deflect the coloring-matter up through an opening in the top of the box, then through a stencil placed over said opening, and the coloring-matter then paints the corresponding figure or design upon the surface placed over said stencil.

The invention is the same as that for which an application for English Provisional Letters Patent was filed by me in Great Britain February 21, 1898, No. 4,240, and is fully disclosed in the following specification, of which the accompanying drawings form a part, in which the separate parts of my improvement are designated by the same letters of reference in each of the views, and in which—

Figure 1 represents a front elevation of my device, showing several of the tanks grouped together to be operated by a continuous shaft and showing the front of one tank broken away to show the brush and serrated roller. Fig. 2 is a plan view of same, showing the color-container. Fig. 3 is a rear elevation of the same, showing the color-container. Fig. 4 is an end elevation of the same. Fig. 5 is a vertical sectional view of the tank. Fig. 6 is a plan view of bottom part of tank. Fig. 7 is a plan view of the splasher-bars in gear against sides of brush. Fig. 8 is a plan view of splasher-brush out of gear or away from sides of brush. Fig. 9 is an end elevation of the upper part of the tank. Fig. 10 is a view of a vertical end section of upper part of tank, showing splasher-bars against sides of brush. Fig. 11 is the same, showing splasher-bars away from sides of brush. Fig. 12 is a view of a vertical side section of one splasher-bar in gear position against the side of brush. Fig. 13 shows the same with splasher-bar out of gear and away from the brush; and Fig. 14 is an end elevation of the color-container, showing the color outlet and guides.

Referring to the drawings, A is a tank or box, preferably rectangular, which may be of wood, tin, or any suitable substance. It consists of an upper portion A', in which is installed the paint-feeding apparatus, hereinafter to be described, and a lower portion A", in which is mounted the serrated rolls for picking up the paint which surrounds it in the bottom portion of the tank A, which is made, preferably, with shelving sides. The portion A" also has an extension A''', hereinafter described.

In the ends of the tanks A suitable bearings B' are mounted and a shaft B" journaled therein, which may be turned by a handle B''', extending through the tank from end to end. Upon this shaft is fixed a cylindrical brush B, composed of long hair, sable-hair, bristles, cocoanut fiber, or some similar substance with sufficient elasticity to fling the paint tangentially when revolved, put under pressure, and released. In the same vertical plane with the shaft B" of the brush B and below said shaft is mounted a serrated roller Cc, on a shaft Cb, having suitable bearings Ca. The peripheries of these cylinders infringe slightly, so that a close engagement exists between the brush B and the serrated roller Cc, and upon their mutual revolution the roller Cc will pick up paint from the bottom of the tank A and feed it into the brush B.

At either side of the brush B and approximately parallel with the shaft B" of the brush B is a shaft C, from each end of which projects a hooked counter-shaft C″, journaled in suitable bearings C′. The ends C‴ of the shaft C project normally beneath cleats C″″ on the ends of the box A and adjacent to the bearings C′, and a weight D, attached to the shaft C and projecting away from the brush B, tends to keep the shaft C in the above-described position, which brings it in contact with the brush B, and the function of this shaft C or splasher-bar is to compress and release portions of the bristles or otherwise rough brush B and project the paint tangentially upward. When it is desired to disengage this splashing-bar from the brush periphery, a series of levers E F G are put into operation. Of these levers F and G each engage loosely at their lower ends F′ G′ an end C‴ of the shaft C. At their upper ends F″ G″ they are pivoted to the lever E at its lower end E′. The lever E passes upward and out of the tank A, being guided by a suitable support E″. When the lever E is thrown downward, the shaft C will be also depressed and removed from contact with the brush B and the weight D thrown upward. By allowing the lever E to rise the weight D will force the shaft C back against the cleats C″″ and the brush B.

It is desirable to keep the level of paint in the tank A approximately even with the lowermost peripheral line of the roller Cc, that too much paint may not be fed into the brush B. To this end a paint-supply tank is installed, comprising a tank H, located on one of the sides of the tank A on its upper portion A′. This tank has a movable cover or other suitable means of access and a feed-vent H′, located in its lower portion and surrounded with guides H″, in which moves a slide-valve H‴, with a corresponding vent H″″, adapted to register with the vent H′, and provided with a communicating vertically-movable pipe K, which extends downwardly through the upper side of an extension A‴ of the bottom portion A″ of the tank A, said extension A‴ having communication and an attitudinally coincident bottom with the lower portion A″ of the tank A. Within this portion A‴ of A″ is a float J, and to this float the pipe K is attached. The paint passing through the registering vents H′ H″″ passes down the pipe K and out of it at the float J. The pipe K is made of such length that the float will push it upward and cut off the vent H′ by the slide-valve H‴ when the paint has reached a level in the bottom of A″ as high as desired, as before explained.

In the upper side of the box A, as at A″″, is arranged a vent over which a stencil may be arranged registering with said vent, (vent and stencil not shown,) and above the stencil may be supported an article to be colored.

The operation of the device is as follows: The paint feeding down from the tank H through the pipe K, automatically operated by the float J to cut off the tank H, is picked up by the serrated roller Cc, which engages the brush B, both said roller and said brush being turned by the shaft B″ and the handle B‴, the brush turning the roller by its friction engagement. The paint picked up by the serrated roller Cc smears the brush B, which is continually compressed and released at its surface by the shafts or splashing-bars C, with the result that the paint is thrown off tangentially and upwardly through the vent at the top of the tank A and through the stencil and onto the article to be decorated, producing thereon an image kindred to the stencil design.

The devices above described may be operated singly, or a series of them may be placed side by side, as shown in Figs. 1, 2, and 3, and the shaft B″ made to extend through the whole series. The shaft projection ends C″ may also be united throughout the series of devices and a single color-supply tank and devices be used, all the tank-bottoms A″ being united.

I have described my invention as applicable to decorating tiles and kindred objects; but do not wish to limit myself to any class of decoration, as toys, books, bric-à-brac, and numerous classes of articles may be also decorated thereby.

Having fully described my invention, I claim as new and desire to secure by Letters Patent—

1. In a color-tank, the combination with a rotatable brush, of a roller furnishing means to feed color to said brush, a weighted bar pivotally mounted in said tank furnishing means to vibrate the surface of said brush and devices for depressing said bar to disengage it from said brush, substantially as described.

2. The combination with a color-tank, containing a brush, a serrated feed-roller and means for vibrating the surface of said brush, of a color-supply tank, communicating with said color-tank, substantially as described.

3. In a color-tank, a brush, a feed-roller, and means for vibrating said brush, comprising a bar pivoted at each end in the ends of said tank and contiguous to said brush, a weight extending laterally from said bar, means for locking said bar and for disengaging it from said brush, substantially as described.

4. In a color-tank, a brush, and means for vibrating said brush, comprising a bar pivoted in the ends of said tank and contiguous to said brush, on curved projections extending out from and parallel to said bar, a weight on said bar projecting laterally therefrom, the ends of said bar projecting normally beneath cleats on the ends of said tank and having means consisting of levers for lowering said bar and disengaging it from said brush, substantially as described.

5. In an apparatus of the class described, a color-tank, a color-supply tank communicating therewith and means for regulating the supply of color from the color-supply tank to the color-tank, comprising a vent in said color-supply tank, guides surrounding said vent, a slide-valve in said guides, a vent in said slide-valve, a pipe extending from and communicating with the slide-valve and terminating in engagement with a float in said color-tank, substantially as described.

6. The combination with a plurality of communicating color-tanks, each containing a brush, a serrated feed-roller and independent adjustable means for vibrating said brush, of a color-supply tank communicating therewith, and means for simultaneously operating said brushes and said rollers, substantially as shown and described.

In testimony that I claim the foregoing as my invention I have signed my name, in presence of the subscribing witnesses, this 5th day of September, 1898.

THOMAS HOLT.

Witnesses:
WILLIAM MAGUIRE,
JOHN HY COPESTAKE.